US 12,234,953 B2

(12) United States Patent
Desmet

(10) Patent No.: US 12,234,953 B2
(45) Date of Patent: Feb. 25, 2025

(54) DEVICE AND METHOD FOR MEASURING A CONDUIT IN A SUBMERGED OR SUBTERRANEOUS ENVIRONMENT

(71) Applicant: iSensPro NV, Leuven (BE)

(72) Inventor: Yves Marie-Louis Gabriël Desmet, Leuven (BE)

(73) Assignee: ISENSPRO NV, Leuven (BE)

( * ) Notice: Subject to any disclaimer, the term of this patent is extended or adjusted under 35 U.S.C. 154(b) by 0 days.

(21) Appl. No.: 18/719,606

(22) PCT Filed: Dec. 9, 2022

(86) PCT No.: PCT/EP2022/085145
§ 371 (c)(1),
(2) Date: Jun. 13, 2024

(87) PCT Pub. No.: WO2023/110665
PCT Pub. Date: Jun. 22, 2023

(65) Prior Publication Data
US 2024/0426434 A1    Dec. 26, 2024

(30) Foreign Application Priority Data
Dec. 15, 2021    (NL) ...................................... 2030136

(51) Int. Cl.
G01N 17/04    (2006.01)
F17D 5/00    (2006.01)

(52) U.S. Cl.
CPC .............. *F17D 5/00* (2013.01); *G01N 17/04* (2013.01)

(58) Field of Classification Search
CPC .................................. F17D 5/00; G01N 17/04
See application file for complete search history.

(56) References Cited

U.S. PATENT DOCUMENTS 4,101,827 A * 7/1978 Offner ..................... G01M 3/18
324/718
7,915,901 B2 * 3/2011 Bell ....................... G01N 17/04
324/700
(Continued)

FOREIGN PATENT DOCUMENTS

EP    3511705 A1 * 7/2019    .............. G01M 3/18
JP    2001183328 A * 7/2001

OTHER PUBLICATIONS

Li X. et al., "Coating studies of buried pipe in soil by novel approach of electrochemical impedance spectroscopy at wide frequency domain", Corrosion Engineering, Science and Technology, vol. 50, No. 3, Feb. 23, 2015, pp. 218-225, XP055940020.
(Continued)

*Primary Examiner* — Jay Patidar
(74) *Attorney, Agent, or Firm* — KDW Firm PLLC

(57) ABSTRACT

A device for measuring a conduit arranged in a submerged or subterraneous environment and surrounded by an insulator layer. The device includes a first electrode; a mounting unit to be arranged on a surface of the conduit to create an enclosure against the surface, the enclosure containing the first electrode and configured to form a dielectric between the first electrode and the environment. A second electrode is configured to be arranged at a distance of the surface and at a distance of the first electrode and is intended to be in contact with the environment. A measurement instrument is configured to determine a value which is representative of an impedance between the first electrode and the second electrode.

18 Claims, 7 Drawing Sheets

(56) References Cited

U.S. PATENT DOCUMENTS

| | | |
|---|---|---|
| 2010/0039125 A1 | 2/2010 | Buchler |
| 2019/0064092 A1 | 2/2019 | Zhang |
| 2019/0391097 A1 | 12/2019 | Nicolas |
| 2020/0300751 A1 | 9/2020 | Desmet |

OTHER PUBLICATIONS

International Search Report and Written Opinion for International Application No. PCT/EP2022/085145, filed Dec. 9, 2022, 9 pages.

\* cited by examiner

DEVICE AND METHOD FOR MEASURING A CONDUIT IN A SUBMERGED OR SUBTERRANEOUS ENVIRONMENT

This application is a national stage filing under 35 U.S.C. 371 of pending International Application No. PCT/EP2022/085145, filed Dec. 9, 2022, which claims priority to Netherlands patent application 2030136, filed Dec. 15, 2021, the entirety of which applications are incorporated by reference herein.

FIELD OF INVENTION

The present invention relates to a device for measuring a conduit, such as an umbilical, wherein the conduit is arranged in a submerged or subterraneous environment. Moreover, the present invention relates to a method for measuring a conduit, such as an umbilical, being arranged in a submerged or subterraneous environment.

BACKGROUND

For bulk transport of fluids, such as gas or oil, conduits are used in which the fluid is transported through the conduit. Similarly, for bulk transport of electrical power or signals conduits are also used, for example electrical conduits or fibre-optic cables. Although the conduits for fluids and electric power are constructionally different, they share a common purpose and are arranged in a similar way and environment. The conduits are typically arranged in a submerged environment and/or subterraneous environment, for example at the bottom of a channel, on a seabed or under the ground surface. If left untreated, the submerged environment and/or subterraneous environment typically oxidizes an outer surface of the conduits, which causes damage. Also, moisture can ingress between electrical conductors causing short-circuits or more generically, damage. To protect the conduit from such corrosion or ingress, a coating or a protective cover is applied to the outside of the conduit. However, the coating or protective cover is also prone to damage, a dent or score in the coating or cover would allow the covered conduit to be exposed to the environment such that ingress of moisture or corrosion can occur. Additionally, submerged conduits are subject to marine animal damage, sharks biting electrical conduits are well documented examples of this issue.

The conduits have to be maintained because of these reasons. However, the conduit is not only difficult to reach, determining that a conduit is corroded or comprises moisture between the conduit and its protective cover in a submerged or subterraneous environment is difficult.

An object of embodiments of the present invention is to provide a device and method allowing to accurately detect corrosion and/or moisture, and in part a device which is easy to use and cost-efficient.

SUMMARY

According to a first aspect the invention provides for this purpose a device for measuring a conduit being arranged in a submerged or subterraneous environment and is surrounded by an insulator layer. The device comprises a first electrode, a mounting unit configured to be arranged on a surface of the conduit and to create an enclosure against the surface, said enclosure containing the first electrode and configured to form a dielectric between the first electrode and the environment, and a second electrode configured to be arranged at a distance of the surface and at a distance of the first electrode, wherein the second electrode is intended to be in contact with the environment; a measurement instrument configured to determine a value which is representative of an impedance between the first electrode and the second electrode.

The mounting unit forms a dielectric between the first electrode and the environment and thus also between the first electrode and second electrode. In this way the first and second electrode and the mounting unit form a capacitor, wherein the first and second electrode form the two poles of said capacitor. The advantage hereof is based on the insight that the impedance between the two poles comprises a plurality of components. A first impedance component of the plurality of components is substantially determined by the dielectric which is formed by the mounting unit and/or the surrounding situated between the first electrode and second electrode. The first impedance component is relatively constant, particularly because the resistance and the reactance of the mounting unit and/or surrounding environment changes very little to none. Put differently, the composition of the environment does not substantially change and therefore its resistance and reactance does not substantially change. A similar reasoning is applicable to the mounting unit. The second component is substantially determined by the dielectric which is formed by the insulator layer and the surrounding environment. When the conduit is good condition, the impedance formed by the plurality of components is known. However, when moisture is present under or in the insulator layer or corrosion is formed on a surface of the conduit the impedance of the insulator layer or the conduit underneath the impedance of the insulator changes. This change in the value of the impedance indicates degradation of the surface layer of the conduit, for example due to corrosion, or indicates the presence of moisture in the insulator. The device thus allows to accurately detect corrosion and/or moisture, and is also easy to use and cost-efficient.

Preferably, the enclosure comprises at least one peripheral wall having a lower edge intended to be in sealing contact with the surface, said peripheral wall delimiting the enclosure containing the first electrode. The lower edge seals the enclosure from the environment. In this way short-circuit measurements directly between the first and second electrode without any dielectric in between are substantially avoided, further improving the accuracy of the device.

Preferably, the enclosure is further delimited by an upper wall joining the peripheral wall, wherein the first electrode is a plate arranged against or in the upper wall. The upper wall seals the enclosure entirely, such that the enclosure is sealed from the environment further improving the accuracy of the device. The first electrode being a plate has the advantage that a surface area of the first electrode is substantially large. This facilitates the determining of the impedance value.

Preferably, the enclosure is intended to encompass a portion of the environment when the mounting unit is arranged on the surface. Conduits are typically cylindrically shaped, but may have different diameters. The curvature of conduits at a peripheral surface thereof may differ. Ensuring that the first electrode snuggly fits to the peripheral surface is difficult. An advantage of encompassing a portion of the environment is that the environment for example dirt or water is conductive. Also, the environment, particularly the aqueous environment, is malleable. The encompassed portion of the environment will fill the enclosure, forming a conductive layer of contact between the first electrode and the peripheral surface of the conduit. In this way, the first electrode is electrically connected to substantially the entire portion of conduit which the enclosure covers.

Preferably, the second electrode is integrated in the mounting unit. In this way the distance between the second electrode and the first electrode is reduced. The device can thus be fabricated more compactly. Also, when the second electrode is integrated in the mounting unit, the first impedance component of the impedance is no longer influenceable by the environment further increasing the accuracy of the device.

Preferably, the second electrode is arranged at a peripheral side of the mounting unit. In this way, the second electrode is exposed to the environment in a relatively simple way.

Preferably, the enclosure is made of an elastically compressible material. In this way, the mounting unit as well as the enclosure are easily installable on the conduit. The elastically compressible material will be correspondingly shaped according to the respective conduit it is arranged on. More preferably, the elastically compressible material is an elastomer. More preferably, the elastomer is one or more selected from the group of siloxane-based elastomers, urethane-based elastomers, acrylate-based elastomers.

Preferably, the first electrode and/or the second electrode are at least partially manufactured from a corrosion-resistant material such as stainless steel, galvanized steel, aluminium or graphite. In this way, the first and second electrode are more resistant to corrosion.

Preferably, the mounting unit is further configured to accommodate the measuring instrument. In this way, the device is formed in an integrated and easily transportable way.

Preferably, the device further comprises a controller which is configured to analyse the presence of moisture and/or condensation in the conduit and/or advance of corrosion of the conduit on the basis of the value determined by the measuring instrument. In this way, the device is further designed to be stand-alone.

Preferably, the measuring instrument is configured to transmit the determined value wirelessly through the environment. An advantage hereof is based on the insight that the conduits are often arranged at difficult to reach positions, for example on the ocean bed or subterraneous. By providing the device with a measuring instrument which is configured to transmit the determined value wirelessly through the environment, the device can be arranged on the conduit, covered by the environment and still transmit the determined value without further effort. De device is for example simultaneously submerged when arranged the conduit in the ocean or when the conduit is arranged in the ground.

Preferably, the device further comprises a connection interface arranged above or near the surface of the submerged or subterraneous environment, wherein the connection interface comprises a connection cable extending from the connection interface to the measuring instrument. More preferably, the connection cable is an optical fibre cable for fibre-optic communication of the determined value. In this way, information determined by the device can be measured from outside of the environment. For example, a user may arrive on-site, connect a computer to the connection interface and input the value representative for the impedance to his or her computer.

Preferably, the connection interface comprises at least one of the following power supplies: a wire supply, an energy yield supply and a battery supply. A very long lifespan of the measurement can be obtained with a wire supply, while a battery supply can be inexpensive and simple to install. An energy yield supply can be very energy-efficient and autonomous, which can be advantageous in the case of conduits which are difficult to reach (such as long-distance conduits).

Preferably, the connection interface comprises an antenna configured to transmit the determined value wirelessly. In this way the convenience of use can be increased. In addition, central control can be made possible.

Preferably, the mounting unit is fixed on the surface by fixations means configured to clamp the mounting unit on the surface or configured to press the mounting unit against the surface.

The skilled person will understand that the hereinabove described technical considerations and advantages for the device embodiments also apply to the below described corresponding method embodiments, mutatis mutandis.

According to a second aspect a method for measuring a conduit being arranged in a submerged or subterraneous environment is provided. The method comprising moving a mounting unit, a first electrode and a second electrode through the environment; arranging the mounting unit on a surface of the conduit thus creating an enclosure against the surface; containing the first electrode in the first enclosure such that the enclosure forms a dielectric between the first electrode and the environment; arranging a second electrode at a distance of the surface and at a distance of the first electrode, wherein the arranging of the second electrode comprises arranging the second electrode in contact with the environment; determining a value which is representative of an impedance between the first electrode and the second electrode.

Preferably, the method further comprises providing the enclosure with at least one peripheral wall having a lower edge, said peripheral wall delimiting a recess containing the first electrode, and sealingly engaging the lower edge on the surface.

Preferably, the arranging of the mounting unit comprises encompassing a portion of the environment in the enclosure.

Preferably, the arranging of the mounting unit comprises pressing or clamping the mounting unit on the surface.

BRIEF DESCRIPTION OF THE FIGURES

The accompanying drawings are used to illustrate presently preferred non-limiting exemplary embodiments of devices of the present invention. The above and other advantages of the features and objects of the invention will become more apparent, and the invention will be better understood from the following detailed description when read in conjunction with the accompanying drawings, in which.

DESCRIPTION OF EMBODIMENTS

This and other aspects of the present invention will now be described in more detail, with reference to the appended drawings showing a currently preferred embodiment of the invention. Like numbers refer to like features throughout the drawings.

The description and drawings merely illustrate the principles of the present invention. It will thus be appreciated that those skilled in the art will be able to devise various arrangements that, although not explicitly described or shown herein, embody the principles of the present invention and are included within its scope. Furthermore, all examples recited herein are principally intended expressly to be only for pedagogical purposes to aid the reader in understanding the principles of the present invention and the concepts contributed by the inventor(s) to furthering the art, and are to be construed as being without limitation to such specifically recited examples and conditions.

In the present invention, expressions such as "comprise", "include", "have", "may comprise", "may include", or "may have" indicate existence of corresponding features but do not exclude existence of additional features.

Figure 1:
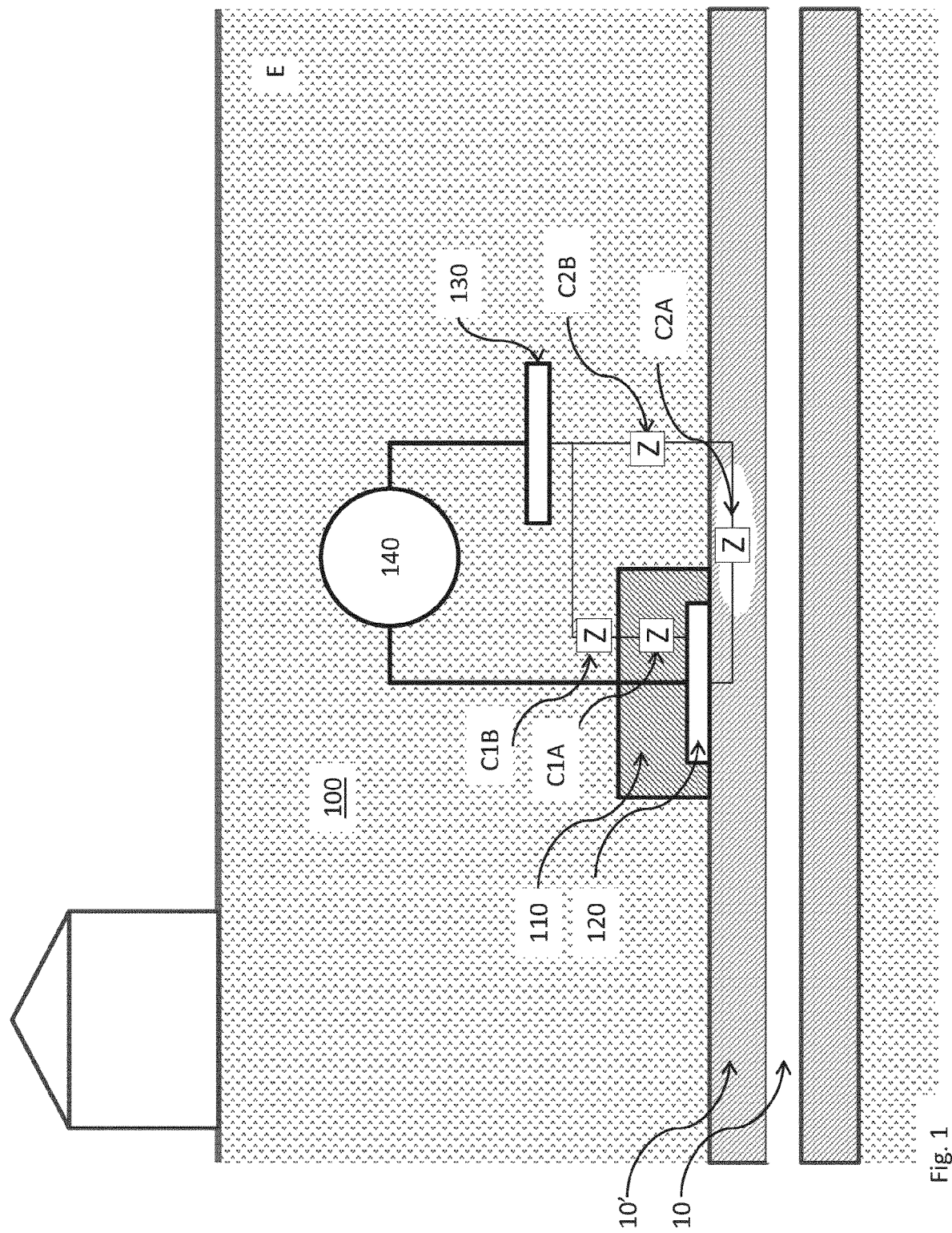
FIG. 1 illustrates a schematic representation of a device according to a preferred embodiment arranged on a conduit being arranged in a subterraneous environment.

FIG. 1 illustrates schematically an exemplary embodiment of a device 100 for measuring a conduit 10 being arranged in a subterranean environment.

The conduit 10 illustrated in FIG. 1 is a conduit for transporting fluids such as water, oil or gas. Such a conduit is also referred to as a pipeline. The conduit 10 is often arranged subterraneously as illustrated in FIG. 1 and is surrounded by an insulator layer 10' to protect the conduit 10 from corrosion. The insulator layer 10' may be a coating applied to the peripheral surface of the conduit 10 or another protective surface layer, such as a cathodic protection. In order to illustrate the principles of the invention the insulator layer 10' is substantially enlarged.

The device 100 for measuring the conduit 10 illustrated in FIG. 1 comprises a mounting unit 110, a first electrode 120, a second electrode 130 and a measurement instrument 140. The mounting unit 110 is configured to be arranged on a surface of the conduit 10, particularly an outside surface of the insulating layer 10'. The outside surface of the conduit 10 or the outside surface of insulating layer are interchangeably used in the context of this description, unless explicitly stated to the contrary. The mounting unit 100 is further configured to create an enclosure against the surface of the conduit 10. In the context of this description, the enclosure is an area delimited by the mounting unit 110 and the surface of the conduit 10. However, the enclosure also refers to a portion of the mounting unit 110 as will be elaborated with respect to FIG. 3. The mounting unit 110 contains the first electrode 120 in the enclosure and is configured to form a dielectric between the first electrode 120 and the environment E. Although the mounting unit 110 thus electrically insulates the first electrode 120 from the environment E, an electric permittivity thereof influences an impedance value as will be illustrated here below. The second electrode 130 is configured to be arranged at a distance of the surface of the conduit 10' and at a distance of the first electrode 120.

The second electrode 130 is intended to be in contact with the environment. Put differently, the second electrode 130 is arranged such that it is at least partially exposed to the environment. The second electrode 130 may also be entirely exposed to the environment E, as is illustrated in FIG. 1. The measurement instrument 140 is configured to determine a value which is representative of an impedance between the first electrode 120 and the second electrode 130. As described here above, the mounting unit 110 forms a dielectric between the first electrode 120 and the environment E and thus also between the first electrode 120 and second electrode 130. Even though the environment E is at least partially conductive because of the presence of moisture and ions, the first electrode 120 and second electrode 130 form the two poles of a capacitor. The impedance between the first electrode 120 and second electrode 130 comprises a plurality of components. A first impedance component C1A+C1B of the plurality of components is primarily determined by the dielectric which is formed by the mounting unit 110 and/or the surrounding environment situated E between the first electrode 120 and second electrode 130. The first impedance component C1A+C1b is relatively constant because the first impedance component comprises a first impedance subcomponent C1A and a second impedance subcomponent C1B illustrated as capacitive symbols in FIG. 1 for illustrational purposes. The first impedance subcomponent C1A is primarily determined by the dielectric characteristics of the mounting unit 110 and does substantially not change. Particularly because the resistance and the reactance of the mounting unit 110 are constant, barring any wear and tear to the mounting unit 110. The second impedance subcomponent C1B is determined by the permittivity of the surrounding environment E. Because changes to the composition of the environment E are limited, if any, for example the composition of earth surrounding the mounting unit 110 in a subterranean environment does not change substantially, the reactance and resistance thereof remains substantially constant. Since neither the first nor the second impedance subcomponent of the first impedance component C1A+C1B changes, the first impedance component C1A remains substantially constant. The second component C2A+C2B is substantially determined by the dielectric which is formed by the insulator layer 10' and the surrounding environment E. Particularly, the insulator layer 10' determines a first impedance subcomponent C2A and the environment determined a second impedance subcomponent C2B of the second component C2A+C2B. The second impedance subcomponent C2B of the second component C2A+C2B is similar if not identical to the second impedance subcomponent C1B of the first impedance component C1A+ C1B. When the conduit is good condition, the impedance formed by the plurality of components is known and constant. However, when moisture is present under or in the insulator layer 10' or corrosion is formed on a surface of the conduit 10 the impedance of the insulator layer 10' or the conduit underneath the insulator changes. Particularly, the first impedance subcomponent 2CA will change due to the moisture or corrosion because the impedance of the insulator layer changes, which causes a change in the phase measurement and a change in the amplitude measurement. This change in the value of the impedance indicates degradation of the surface layer of the conduit, for example due to corrosion, or indicates the presence of moisture in the insulator. The device 100 thus allows to accurately detect corrosion and/or moisture, and is also easy to use and cost-efficient. The other impedances subcomponents C1A, C1B, C2B (shown in a simplified model in FIG. 1) will also influence the measurements, but a change of the measured value will be representative of a degradation of the surface layer. The measurement instrument 140 may comprise an electrochemical impedance spectroscopy measurement instrument or any other AC impedance measurement. Using such a measurement, the phase and amplitude of the impedance is obtained in function of the frequency. Also other AC or DC measurement instruments are possible as long as it is possible to determine a value which is representative of the impedance between the first electrode 120 and second electrode 130 underneath said portion of the insulator 2.

Preferably, the first electrode 120 and/or the second electrode 130 are at least partially manufactured from a corrosion-resistant material such as stainless steel, galvanized steel, aluminium or graphite. In this way, the first and second electrode are more resistant to corrosion.

Figure 2:
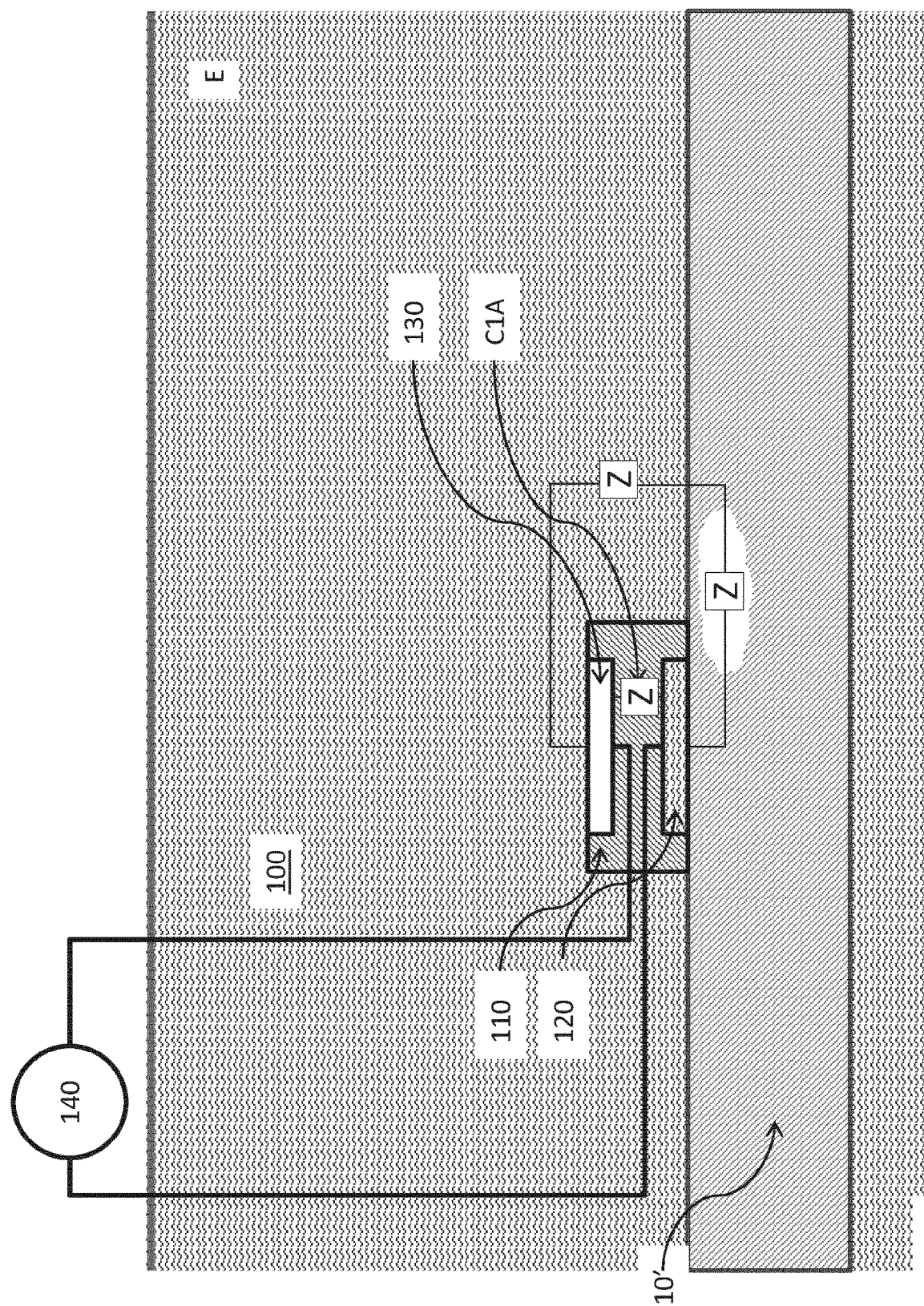
FIG. 2 illustrates a schematic representation of a device having an integrated second electrode according to a further preferred embodiment arranged on a conduit in a submerged environment.

FIG. 2 illustrates schematically an exemplary embodiment of a device for measuring a conduit 10 being arranged in a submerged environment.

The conduit 10' is illustrated as a submarine communications or power cable which may contain a group of electrical conductors and/or fiber optics that carry electric power, video, and/or data signals between two locations.

FIG. 2 illustrates that the measurement instrument 140 may be arranged outside of the environment, for example on the surface of the water.

The device 10 of FIG. 2 further illustrates that the second electrode 130 is preferably integrated in the mounting unit 110. In this way the distance between the second electrode 130 and the first electrode 120 is reduced. The device 100 can thus be fabricated more compactly. Also, when the second electrode 130 is integrated in the mounting unit 110, the first impedance component C1A no longer comprises a second impedance subcomponent. Only the known first impedance subcomponent C1A is present. The influence of the surrounding the environment is reduced in this way which further increases the accuracy of the device 100.

Moreover, FIG. 2 illustrates that the enclosure formed by the mounting unit 110 may be intended to encompass a portion of the environment E when the mounting unit is arranged on the surface of the conduit 10. An advantage thereof is based on the insight that conduits are available in all shapes and sizes. Ensuring that the first electrode 120 snuggly fits to the peripheral surface of the conduit 10' is difficult. An advantage of encompassing a portion of the environment E is that the environment for example dirt or water is conductive. Also, the environment, particularly the aqueous environment, is malleable. The encompassed portion of the environment will fill the recess, forming a conductive layer of contact between the first electrode 120 and the peripheral surface of the conduit 10'. In this way, the first electrode 120 is electrically connected to substantially the entire portion of conduit which the enclosure covers. Put differently, the environment encompassed by the enclosure forms a part of the first electrode 120.

In order to fix the mounting unit 110 on the surface of the conduit 10' fixations means may be used. The fixation means may be a submarine pressing the mounting unit 110 on the surface of the conduit. The fixation means may also be a clamp configured to clamp the mounting unit on the surface.

Figure 3:
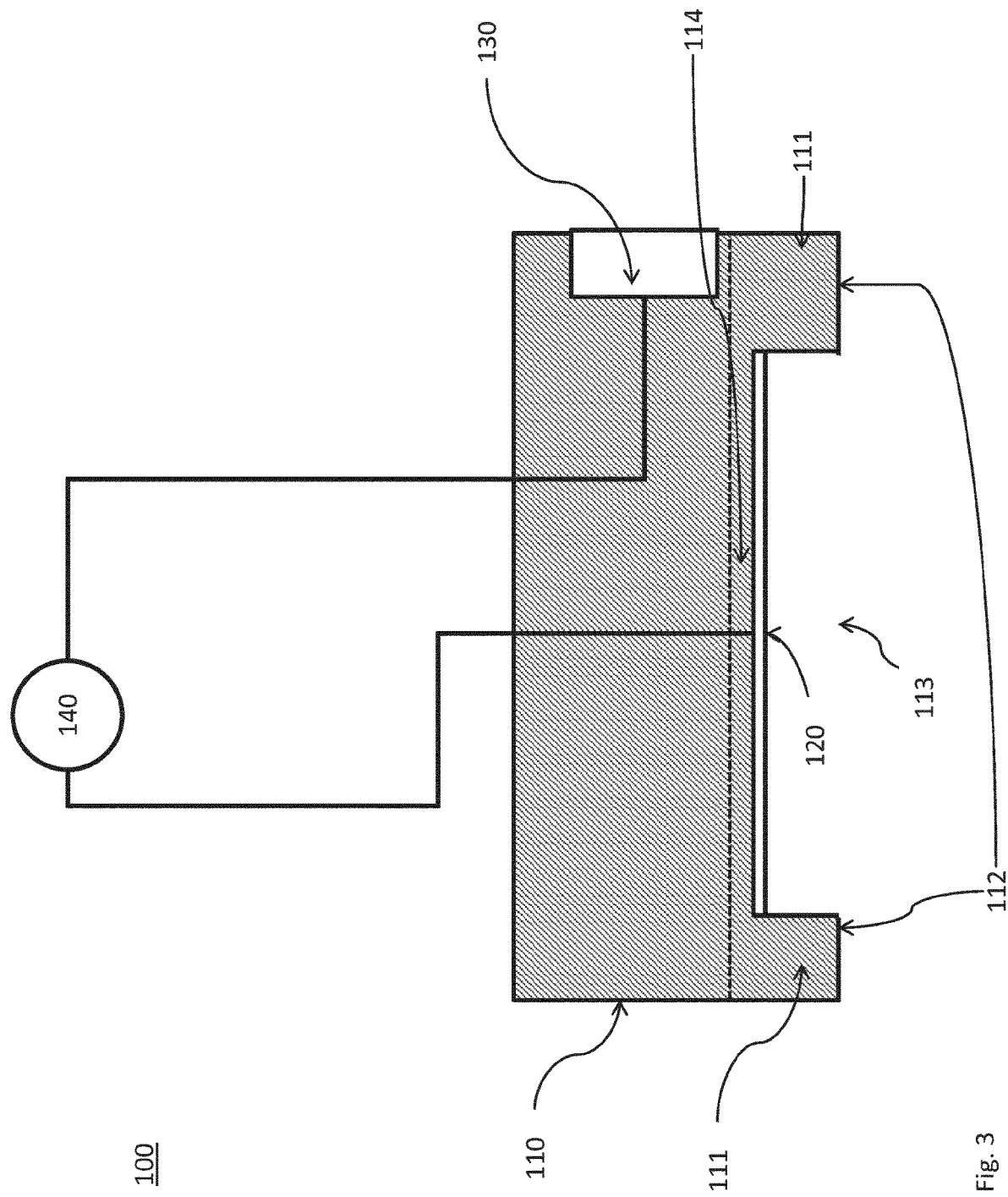
FIG. 3 illustrates a schematic representation of a device accommodating a measuring instrument and a controller according to a preferred embodiment.

FIG. 3 schematically illustrates a device 100 having an integrated second electrode 130 and an enclosure according to an exemplary embodiment.

The device 100 illustrated in FIG. 3 comprises at least one peripheral wall 111 having a lower edge 112 intended to be in sealing contact with the surface of a conduit (not shown). The peripheral wall 111 forms the enclosure containing the first electrode 120. The lower edge 112 seals the enclosure from the environment. In this way short-circuit measurements directly between the first and second electrode without any dielectric in between are substantially avoided, further improving the accuracy of the device.

According to the illustrated exemplary embodiment the enclosure is further delimited by an upper wall 114 joining the peripheral wall 111. Additionally, the first electrode 120 is a plate arranged against or in the upper wall 114. The upper wall 114 seals the enclosure entirely, such that the enclosure is sealed from the environment further improving the accuracy of the device. The first electrode 120 being a plate has the advantage that a surface area of the first electrode 120 is substantially large. This facilitates the determining of the impedance value. Moreover, in comparison with the embodiment illustrated in FIG. 1, the enclosure containing the first electrode 120 is configured such that an open space 113 is retained even when the first electrode 120 is contained. In this way the advantages of a platelike electrode and encompassing the environment are combined.

The second electrode 130 is preferably arranged at a peripheral side of the mounting unit 110. In this way, the second electrode 130 is exposed to the environment in a relatively simple way. The second electrode 130 may be arranged at any peripheral side of the mounting unit 110. FIGS. 2 and 3 illustrate different locations where the second electrode may be arranged.

The enclosure may made of an elastically compressible material. In this way, the mounting unit 110 as well as the enclosure are easily installable on the conduit. The elastically compressible material will be correspondingly shaped according to the respective conduit it is arranged on. According to a preferred embodiment the mounting unit is entirely made from an elastically compressible material. More preferably, the elastically compressible material is an elastomer. More preferably, the elastomer is one or more selected from the group of siloxane-based elastomers, urethane-based elastomers, acrylate-based elastomers.

Figure 4:
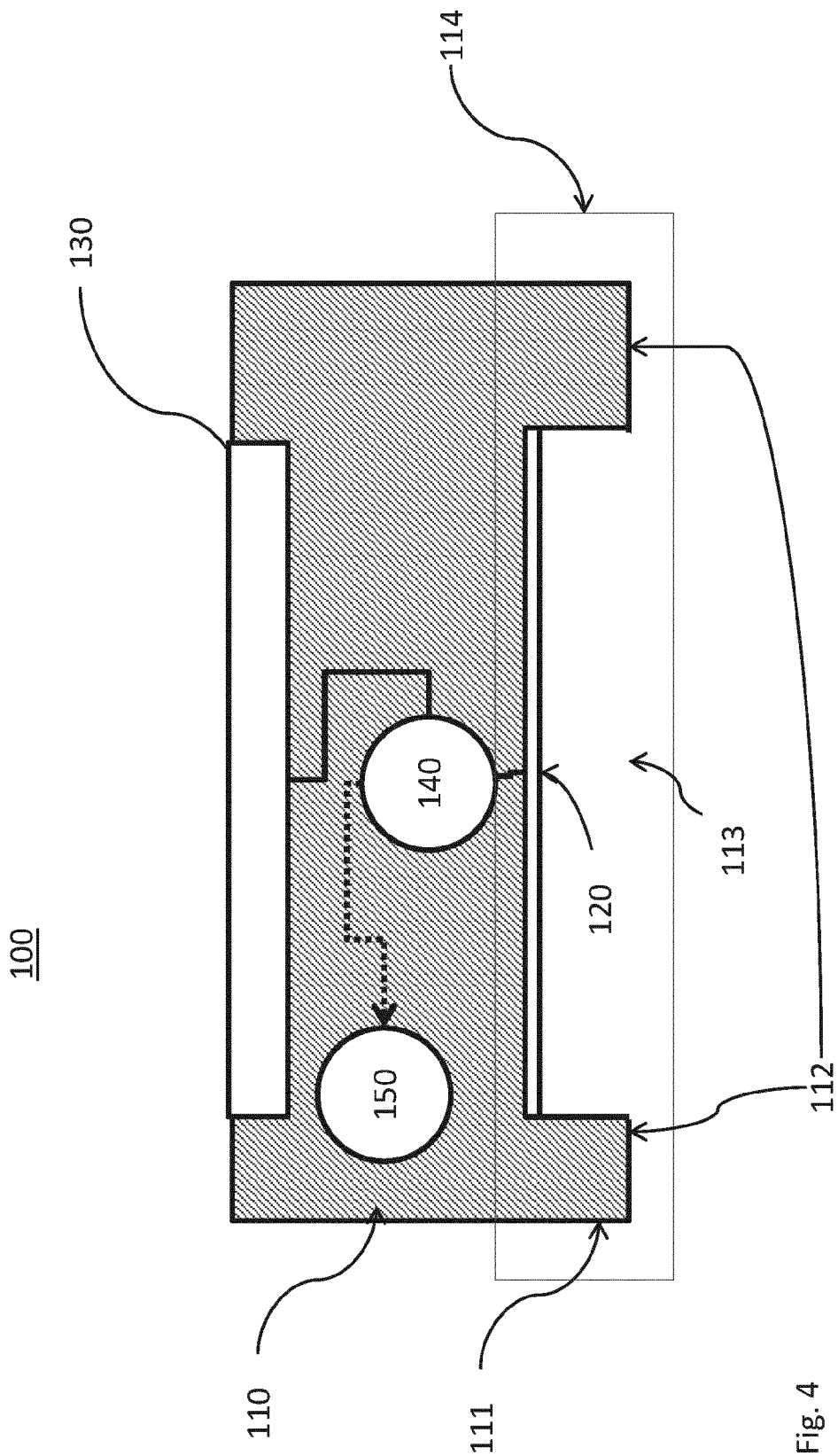
FIG. 4 illustrates a schematic representation of a device having a remote controller according to a preferred embodiment.

FIG. 4 illustrates an exemplary embodiment of a device 100 for measuring a conduit wherein the mounting unit 110 may be further configured to accommodate the measuring instrument 140. In this way, the device 100 is formed in an integrated and easily transportable way.

The device 100 may further comprise a controller 150 which is configured to analyse the presence of moisture and/or condensation in the conduit and/or advance of corrosion of the conduit on the basis of the value determined by the measuring instrument. In this way, the device 100 is further designed to be stand-alone. The controller 150 may be integrated in the mounting unit 110 or may arranged in a remote location or device, for example a ship.

Figure 5:
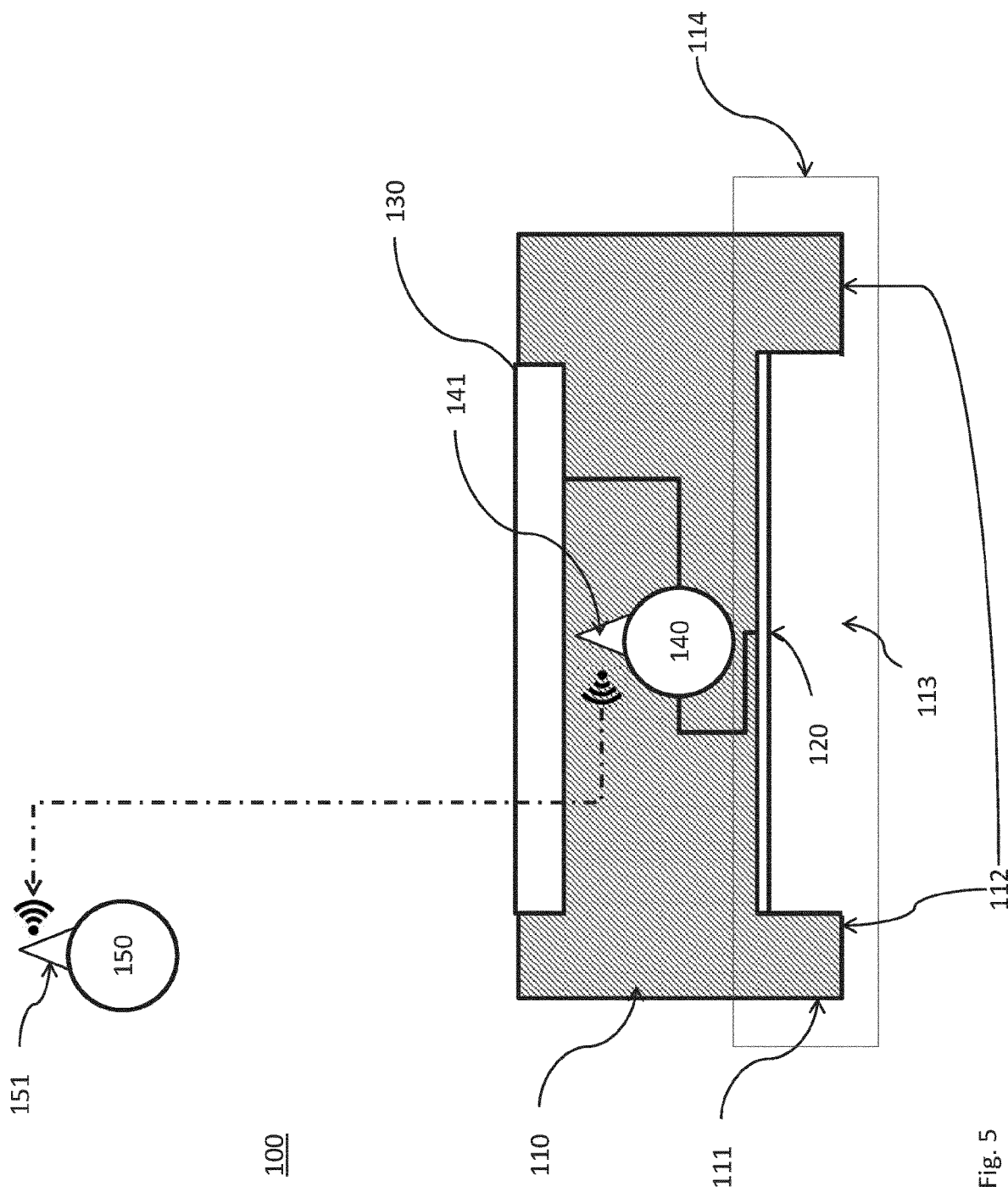
FIG. 5 illustrates a schematic representation of a device comprising a measuring instrument configured to wireless transmit a value according to a preferred embodiment.

FIG. 5 illustrates an exemplary embodiment of a controller 150 being arranged in a remote location.

In such an exemplary embodiment the measuring instrument 140 may be configured to transmit the determined value wirelessly through the environment. An advantage hereof is based on the insight that the conduits are often arranged at difficult to reach positions, for example on the ocean bed or subterraneously under a road. By providing the device 100 with a measuring instrument 140 which is configured to transmit the determined value wirelessly through the environment, the device 100 can be arranged on the conduit, covered by the environment and still transmit the determined value without substantial effort. De device 100 is for example simultaneously submerged when arranged the conduit in the ocean or when the conduit is arranged in the ground.

Figure 6:
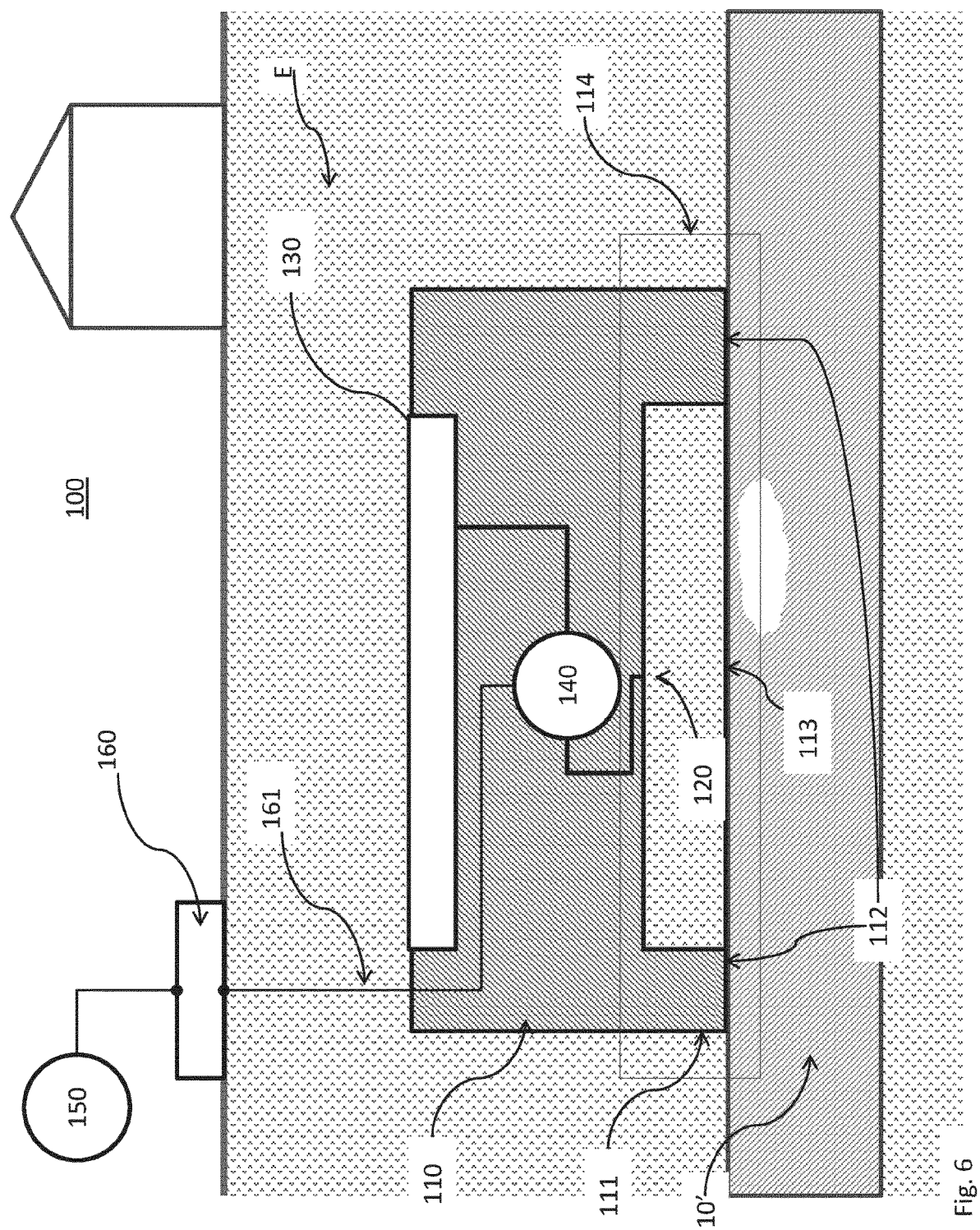
FIG. 6 illustrates a schematic representation of a device comprising a connection interface arranged above the surface of a subterranean environment according to a preferred embodiment.

FIG. 6 illustrates an exemplary embodiment of a device 100 further comprising a connection interface 160.

The connection interface 160 is arranged above or near the surface of the submerged or subterraneous environment E and comprises a connection cable 161 extending from the connection interface to the measuring instrument. More preferably, the connection cable 161 is an optical fibre cable for fibre-optic communication of the determined value. In this way, information determined by the device can be measured from outside of the environment. For example, a user may arrive on-site, connect a computer to the connection interface and input the value representative for the impedance to his or her computer. The connection interface may comprise at least one of the following power supplies: a wire supply, an energy yield supply and a battery supply. A very long lifespan of the measurement can be obtained with a wire supply, while a battery supply can be inexpensive and simple to install. An energy yield supply can be very energy-efficient and autonomous, which can be advantageous in the case of conduits which are difficult to reach (such as long-distance conduits). The connection interface 160 may comprise an antenna configured to transmit the determined value wirelessly, for example to a monitoring system. In this way the convenience of use can be increased. In addition, central control can be made possible.

Figure 7:
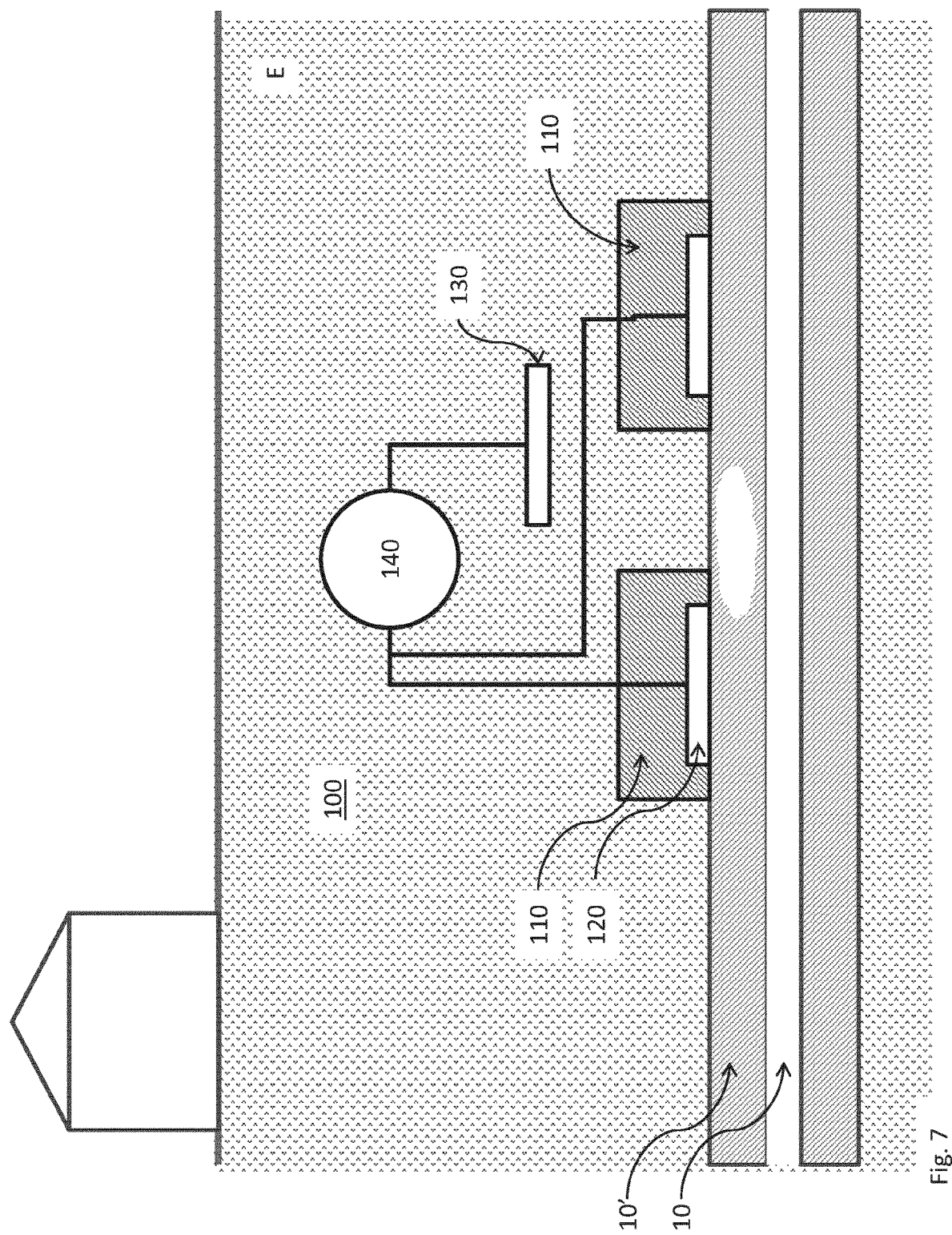
FIG. 7 illustrates a schematic representation of a device comprising a plurality of mounting units according to a preferred embodiment.

FIG. 7 illustrates a preferred embodiment wherein the device 100 comprises a plurality of mounting units 110. FIG. 7 illustrates two mounting units 110 which are arranged on a surface layer of the conduit. By arranging a plurality of mounting units the area in which moisture or corrosion can be detected can be increased in size. A similar effect may be achieved by arranged two first electrodes in a single mounting unit (not shown). The plurality of mounting units 110 may share a common second electrode, as illustrated in FIG. 7. Alternatively, the measuring instrument may determine a value which is representative of an impedance between the first electrode of one of the mounting units and another first electrode of another mounting unit 110 (not shown). It will be clear that more than two mounting units 110 may be arranged on the surface 110.

Although not illustrated in the figures the invention further relates to a method for measuring a conduit being arranged in a submerged or subterraneous environment is provided. The method comprising moving a mounting unit 110, a first electrode 120 and a second electrode 130 through the environment. This may be done when laying the conduit subterraneously or in a submerged environment. Moving the mounting unit through a dirt environment is considered similar to moving the mounting unit through an aqueous environment. Moving the mounting unit through an aqueous environment may be done using submarines or submarine type devices.

The mounting unit 110 is arranged on a surface of the conduit thus creating an enclosure against the surface. The first electrode is contained in the first enclosure such that the enclosure forms a dielectric between the first electrode and the environment. The second electrode is arranged at a distance of the surface and at a distance of the first electrode, wherein the arranging of the second electrode comprises arranging the second electrode in contact with the environment. Finally, a value which is representative of an impedance is determined between the first electrode and the second electrode. The arranging of the mounting unit may comprise encompassing a portion of the environment in the enclosure. This is particularly useful in submerged environments. Moreover, the arranging of the mounting unit may further comprise pressing or clamping the mounting unit on the surface. This may be performed for example using a submarine robot or the like, or clamping the mounting unit to the conduit when the conduit is arranged in the ground or water.

It is noted that the inventor has found that, where the above illustrated embodiments have been described in combination with submerged or subterraneous conduits, the device can also be used to determined moisture ingress in roof insulation. In such an embodiment, the first electrode is arranged on the insulation, for example mineral wool. The second electrode may be formed by an earthing system which is typically readily available in houses or building in general.

It should be noted that the above-mentioned exemplary embodiments illustrate rather than limit the present invention and that those skilled in the art will be able to design alternative embodiments without departing from the scope of the appended claims. In the claims, any reference signs placed between parentheses shall not be construed as limiting the claim. The word "comprising" does not exclude the presence of elements or steps not listed in a claim. The word "a" or "an" preceding an element does not exclude the presence of a plurality of such elements. The usage of the words "first", "second", "third", etc. does not indicate any ordering or priority. These words are to be interpreted as names used for convenience.

Whilst the principles of the present invention have been set out above in connection with specific embodiments, it is to be understood that this description is merely made by way of example and not as a limitation of the scope of protection which is determined by the appended claims.

The invention claimed is:

1. A device for measuring an electrical property of a conduit, wherein the conduit is arranged in a submerged or subterraneous environment and is surrounded by an insulator layer, wherein the device comprises:
   a first electrode;
   a mounting unit configured to be arranged on a surface of the conduit and to create an enclosure against the surface, said enclosure containing the first electrode and configured to form a dielectric between the first electrode and the environment;
   a second electrode configured to be arranged at a distance of the surface and at a distance of the first electrode, wherein the second electrode is intended to be in contact with the environment; and
   a measurement instrument configured to determine a value which is representative of an impedance between the first electrode and the second electrode.

2. The device according to claim 1, wherein the enclosure is formed by at least one peripheral wall having a lower edge in sealing contact with the surface, said peripheral wall delimiting the enclosure containing the first electrode.

3. The device according to claim 2, wherein the enclosure is further delimited by an upper wall joining the peripheral wall, wherein the first electrode is a plate arranged against or in the upper wall.

4. The device according to claim 1, wherein the enclosure encompasses a portion of the environment when the mounting unit is arranged on the surface.

5. The device according to claim 1, wherein the second electrode (130) is integrated in the mounting unit.

6. The device according to claim 5, wherein the second electrode is arranged at a peripheral side of the mounting unit.

7. The device according to claim 1, wherein the enclosure is made of an elastically compressible material.

8. The device according to claim 7, wherein the elastically compressible material is an elastomer.

9. The device according to claim 8, wherein the elastomer is one or more selected from a group of siloxane-based elastomers, urethane-based elastomers, acrylate-based elastomers.

10. The device according to claim 1, wherein the first electrode and/or the second electrode are at least partially manufactured from a corrosion-resistant material.

11. The device according to claim 1, wherein the mounting unit is further configured to accommodate the measuring instrument.

12. The device according to claim 1, further comprising a controller which is configured to analyse presence of moisture and/or condensation in the conduit and/or advance of corrosion of the conduit on the basis of the value determined by the measuring instrument.

13. The device according to claim 1, wherein the measuring instrument is configured to transmit the determined value wirelessly through the environment.

14. The device according to claim 1, further comprising a connection interface (160) arranged above or near the surface of the submerged or subterraneous environment, wherein the connection interface comprises a connection cable extending from the connection interface to the measuring instrument.

15. The device according to claim 14, wherein the connection cable is an optical fibre cable for fibre-optic communication of the determined value.

16. The device according to claim 14, wherein the connection interface comprises at least one of the following power supplies: a wire supply, an energy yield supply and a battery supply.

17. The device according to claim 14, wherein the connection interface comprises an antenna configured to transmit the determined value wirelessly.

18. The device according to claim 1, wherein the mounting unit is fixed on the surface by fixations means configured to clamp the mounting unit on the surface or configured to press the mounting unit against the surface.

* * * * *